(12) United States Patent
Lowry

(10) Patent No.: US 8,944,188 B2
(45) Date of Patent: Feb. 3, 2015

(54) RETAINING ARRANGEMENT, SUB ADAPTOR AND/OR DRILL SPINDLE

(75) Inventor: Jacob Garth Lowry, Warabrook (AU)

(73) Assignee: Cardinal Trading Company Pty Ltd, Branxton, NSW (AU)

( * ) Notice: Subject to any disclaimer, the term of this patent is extended or adjusted under 35 U.S.C. 154(b) by 883 days.

(21) Appl. No.: 12/466,768

(22) Filed: May 15, 2009

(65) Prior Publication Data

US 2010/0123308 A1    May 20, 2010

(51) Int. Cl.
E21B 17/03 (2006.01)
E21B 19/16 (2006.01)
F16L 21/06 (2006.01)
F16L 21/08 (2006.01)

(52) U.S. Cl.
CPC .............. *F16L 21/06* (2013.01); *E21B 17/03* (2013.01); *E21B 19/16* (2013.01); *F16L 21/08* (2013.01)
USPC ............................................ 175/320; 285/90

(58) Field of Classification Search
CPC ... E21B 17/042; E21B 17/043; E21B 17/046; F16L 25/08
USPC ........... 175/320, 325.5, 325.6, 325.7; 285/90, 285/333, 922
See application file for complete search history.

(56) References Cited

U.S. PATENT DOCUMENTS

| | | | | |
|---|---|---|---|---|
| 18,006 A * | 8/1857 | Allen | ............... | 285/90 |
| 1,494,524 A * | 5/1924 | Adamson | ........... | 89/16 |
| 2,176,504 A * | 10/1939 | McLaughlin | ............ | 285/81 |
| 2,482,962 A * | 9/1949 | Boice | ............... | 285/16 |
| 2,756,022 A * | 7/1956 | Sturgeon | ............ | 464/20 |
| 3,260,539 A * | 7/1966 | Herron | ............... | 285/24 |
| 3,502,353 A * | 3/1970 | Burns | ............... | 285/2 |
| 3,744,577 A * | 7/1973 | Williams | ............ | 173/213 |
| 6,550,814 B2 * | 4/2003 | Guesnon et al. | ............ | 285/81 |
| 6,860,514 B2 * | 3/2005 | Wentworth et al. | ............ | 285/92 |
| 6,860,525 B2 * | 3/2005 | Parks | ............... | 285/391 |
| 7,543,650 B2 * | 6/2009 | Richardson | ............ | 166/379 |
| 2007/0228728 A1 * | 10/2007 | Webb | ............... | 285/305 |
| 2007/0261859 A1 * | 11/2007 | Telfer | ............... | 166/381 |
| 2013/0146305 A1 * | 6/2013 | Dupal et al. | ............ | 166/380 |

* cited by examiner

*Primary Examiner* — Kenneth L Thompson
(74) *Attorney, Agent, or Firm* — Morris, Manning & Martin, LLP; Christopher W. Raimund

(57) ABSTRACT

A retaining arrangement suitable for use with a drill string assembly having a sub adaptor and a drill spindle in use connected together, the retaining arrangement including: one or more retaining bodies, the or each retaining body comprising a connection region for removably connecting the or each retaining body to one of the sub adaptor and the drill spindle; and a first retaining or catch region adapted to catch the other of the sub adaptor and drill spindle.

20 Claims, 3 Drawing Sheets

RETAINING ARRANGEMENT, SUB ADAPTOR AND/OR DRILL SPINDLE

FIELD OF THE INVENTION

The present invention relates generally to connecting and retaining devices, in particular applications, being connectors for use in drilling operations.

BACKGROUND OF THE INVENTION

In drilling operations, it is common to use sacrificial or consumable parts in high wear areas. One such area is the drill string assembly. The drill string assembly usually comprises a lesser expensive consumable known as a sub adaptor, which connects the typically more expensive drill spindle to other drill string elements such as a drill bit or drill extension stem. The drill spindle must, in use, operate in forward and reverse, without the sub adaptor uncoupling from the drill spindle.

There have been many ways of locking the sub adaptor to the drill spindle, including: welding tabs between the sub adaptor and spindle. However, these methods often involve damaging the more expensive drill spindle, potential electric shock to welding operators, the need for skilled labour, thread leakage while drilling, and other disadvantages.

The present invention seeks to alleviate one or more of the above mentioned disadvantages.

SUMMARY OF THE INVENTION

According to one aspect of the present invention there is provided a retaining arrangement suitable for use with a drill string assembly having a sub adaptor and a drill spindle in use connected together, the retaining arrangement including: one or more retaining bodies, the or each retaining body comprising a connection region for removably connecting the or each retaining body to one of the sub adaptor and the drill spindle; and a first retaining or catch region adapted to catch the other of the sub adaptor and drill spindle.

According to one form, the connection region is removably connected to one of the sub adaptor and the drill spindle by one or more fasteners. In one form, the connection region includes one or more openings adapted to receive the one or more fasteners.

In a further form, the fasteners are screw thread fasteners and are removably connected to the sub adaptor or drill spindle by a corresponding screw thread arrangement located on the one of the sub adaptor and drill spindle.

In another form, the connection region is arranged around a periphery of the retaining body.

According to one form the or each retaining body is a shell or curved plate. In another form, the or each retaining body is a hollow part-cylinder.

According to one form, the first retaining region includes a catch element and in a further form the catch element is a peripheral flange or rib. In another form, the catch element includes a return or a dove tail.

According to another form, a second retaining region is provided, adjacent the connection region. In one form, the connection region is adjacent a first end of the retaining body and the first retaining region is disposed at a distal or second end. In a further form the second retaining region is in the form of a flange which extends inwardly from an inner periphery of the retaining body, so as in use to engage with a corresponding external feature of the drill spindle or sub adaptor.

According to another form the retaining arrangement further includes a seal element disposed in a central cavity within the drill spindle and sub adaptor. In one form, the seal element is in the form of a tube with one end fastened to one of the sub adaptor and drill spindle and the other end engaged with the other of the sub adaptor and drill spindle. In one form, the one end of the seal element is fastened to one of the sub adaptor and drill spindle by means of an interference fit. In a further form, the other end of the seal element engages with the other of the sub adaptor and drill spindle by frictional engagement by means of an O ring located around the periphery of the other end of the seal element.

According to another aspect the present invention provides a sub adaptor, or consumable, which is adapted to removably mount a retaining device for inhibiting separation of the sub adaptor from a drill spindle when in use.

According to a further aspect the present invention provides a drill spindle which is adapted to removably mount a retaining device for inhibiting separation of a sub adaptor from the drill spindle.

BRIEF DESCRIPTION OF THE DRAWINGS

In order to enable a clearer understanding of the present invention, a preferred embodiment will hereinafter be described with reference to the figures, and in those figures.

DETAILED DESCRIPTION OF A PREFERRED EMBODIMENT

Figure 1:
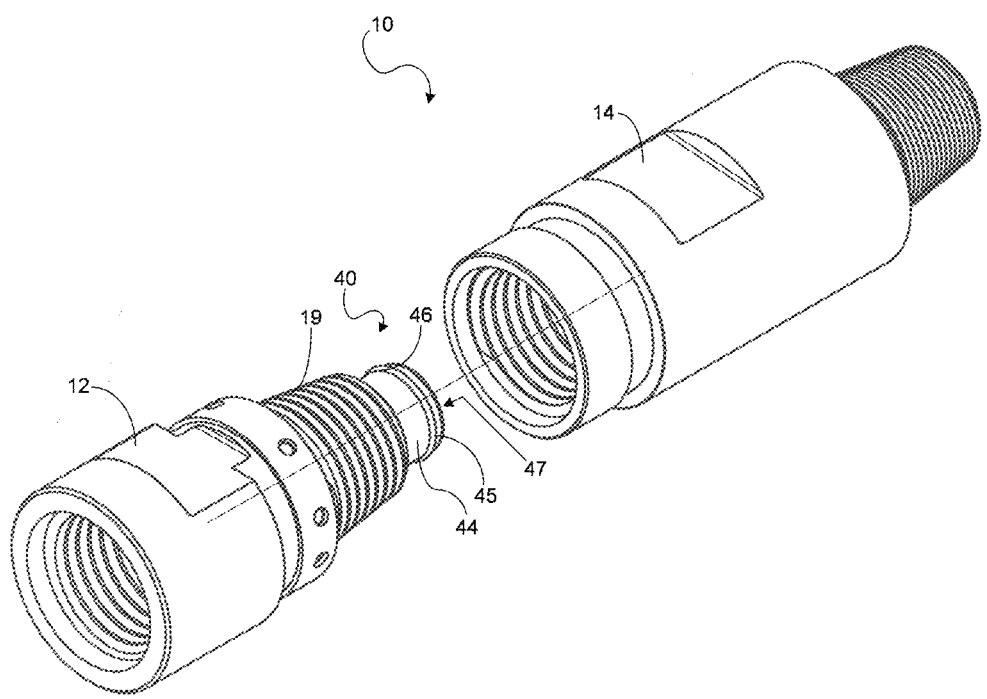
FIG. 1 is an isometric view of a sub adapter and a drill spindle without depicting the retaining bodies of a retaining arrangement.
Figure 2:
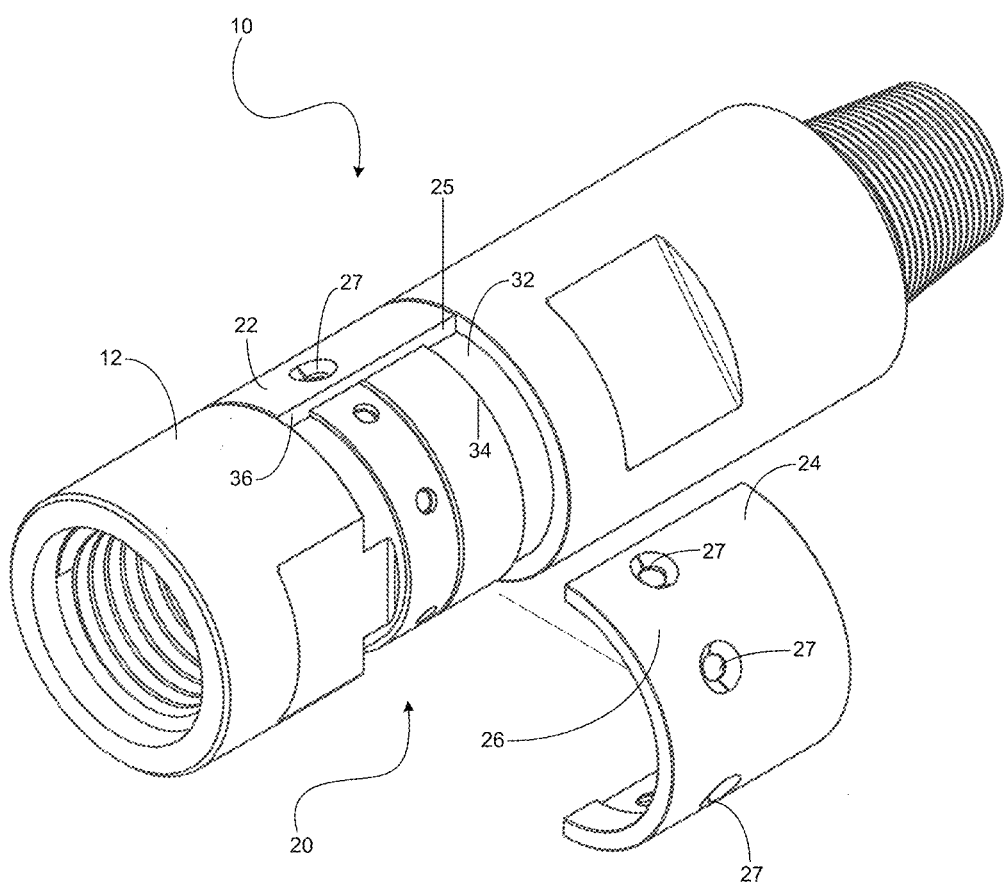
FIG. 2 is an isometric view of a sub adapter and a drill spindle connected together with one retaining body of a retaining arrangement in place and another retaining body removed to show further detail; and, FIG. 3 is an isometric view of a retaining body of a retaining arrangement.
Figure 3:
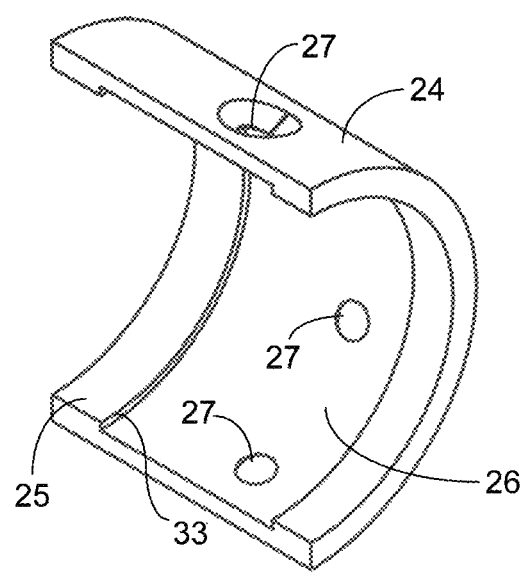

Referring to the drawings there is shown a coupling arrangement generally indicated at 10, the coupling arrangement 10 being suitable for use with a drilling sub adaptor generally indicated at 12.

The drilling sub adaptor 12 is adapted to receive a drill consumable. The sub adaptor 12 in use engages with a drill spindle 14 by thread 19.

In order to inhibit the sub adaptor 12 being disengaged from the spindle 14, a retaining arrangement 20 is provided. The retaining arrangement 20 includes a first retaining body 22 and a second retaining body 24. The retaining bodies 22, 24 are in the form of curved plates, or shells, and are in the embodiment shown, identical half-annular cylinders for improved retention and strength and inter-locking, and one will be described herein, but it is to be understood that the other one incorporates the same features as the first.

The retaining body 24 includes a connection region 26 adapted to removably connect the retaining body 24 to the sub adaptor 12, but it could equally well connect the retainer body to the spindle 14.

The connection region 26 is disposed adjacent a first end of the retaining body 24 and includes a plurality of fastening apertures 27 for receiving threaded fasteners (not shown) there through. The apertures 27 are countersunk for a flush finish with the external periphery of the drilling sub adaptor 12. The apertures 27 may be spaced around the circumference or periphery of the retainer body 22, 24 so as to facilitate improved retaining.

The retainer body 22, 24 further includes a first retaining or catch region 25 adapted to catch a corresponding catch region 32 of the drill spindle 14. The first retaining or catch region 30 is disposed distal the connection region 26, at the second or distal end of the retaining body 22, 24. The first catch region 25 includes a catch 33, comprising a peripheral flange, rib or return or dovetail which in use engages with a similarly-shaped rib or return 34 disposed on the drill spindle 14. The arrangement is such that when connected, the retainer catch 25 positively engages with the spindle 14.

A second retaining or catch region 36 is disposed on the retainer body 22, 24, adjacent the connecting region 26. The second retaining region 36 is like the first 25, and retains the sub adaptor 12 should the fasteners (not shown) fail.

A seal arrangement is provided, generally indicated at 40. The seal 40 includes a seal element in the form of a seal tube 44, which is disposed inside the drill spindle 14 and sub adaptor 12 when in use. The seal tube 44 incorporates an O-ring mounting 45 and when assembled, the O-ring 46 itself. It is to be appreciated that the central passage 47 is a conduit for high pressure water and air and thus the arrangement shown is advantageous in reducing leakage of that water through the sub adaptor/spindle-thread connection. That is, the seal tube 44 mounts on a shoulder (not shown) in an interference fit which is downstream of an upstream end of the drill spindle 14. At the upstream end of the seal tube 44 is the O-ring 46 to inhibit water leaks at that end.

The retaining shells 22, 24 further inhibit water leakage, due to their being a barrier held against the periphery of the sub adaptor, but also due to their retaining function—they inhibit uncoupling or even unscrewing of the sub adaptor, so the O-ring and seal tube are kept between shoulders (not shown) for improved sealing.

The retaining shells 22, 24 are disposed at an outer periphery of the drilling sub adaptor assembly 12 and when in place have an outer surface generally flush with the other outer surfaces of the sub adaptor 12. This is advantageous because the adjoining seals and seal plates may be replaced when the retaining shells 22, 24 are removed.

Those skilled in the art will appreciate that the present invention may be susceptible to variations and modifications other than those specifically described. It is to be understood that the present invention encompasses all such variations and modifications that fall within its spirit and scope.

The reference in this specification to any prior publication (or information derived from it), or to any matter which is known, is not, and should not be taken as, an acknowledgement or admission or any form of suggestion that that prior publication (or information derived from it) or known matter forms part of the common general knowledge in the field of endeavour to which this specification relates.

Throughout this specification and the claims which follow, unless the context requires otherwise, the word "comprise", and variations such as "comprises" or "comprising", will be understood to imply the inclusion of a stated integer or step or group of integers or steps but not the exclusion of any other integer or step or group of integers or steps.

The invention claimed is:

1. A retaining arrangement suitable for use with a drill string assembly having a sub adaptor and a drill spindle in use connected together via a screw thread arrangement, the retaining arrangement including:
   one or more retaining bodies, the or each retaining body comprising a connection region for removably connecting the or each retaining body to one of the sub adaptor and the drill spindle; and
   a first retaining or catch region adapted to catch the other of the sub adaptor and drill spindle;
   wherein the first retaining region includes a catch element;
   wherein the catch element is a peripheral flange or rib;
   wherein the connection region is removably connected to one of the sub adaptor and the drill spindle by one or more fasteners and includes one or more openings adapted to receive the one or more fasteners; and
   wherein the fasteners are screw thread fasteners and are removably connected to the sub adaptor or drill spindle by a corresponding screw thread arrangement located on the one of the sub adaptor and drill spindle.

2. A retaining arrangement according to claim 1 wherein the connection region is arranged around a periphery of the retaining body.

3. A retaining arrangement according to claim 1 wherein the or each retaining body is a shell or curved plate.

4. A retaining arrangement according to claim 1 wherein the or each retaining body is a hollow part-cylinder.

5. A retaining arrangement according to claim 1 wherein the catch element includes a return or a dove tail.

6. A retaining arrangement according to claim 1 wherein a second retaining region is provided, adjacent the connection region.

7. A retaining arrangement according to claim 6 wherein the connection region is adjacent a first end of the retaining body and the first retaining region is disposed at a distal or second end.

8. A retaining arrangement according to claim 6 wherein the second retaining region is in the form of a flange which extends inwardly from an inner periphery of the retaining body, so as in use to engage with a corresponding external feature of the drill spindle or sub adaptor.

9. A retaining arrangement according claim 1 further including a seal element disposed in a central cavity within the drill spindle and sub adaptor.

10. A retaining arrangement according to claim 9 wherein the seal element is in the form of a tube with one end fastened to one of the sub adaptor and drill spindle and the other end engaged with the other of the sub adaptor and drill spindle.

11. A retaining arrangement according to claim 10 wherein the one end of the seal element is fastened to one of the sub adaptor and drill spindle by means of an interference fit.

12. A retaining arrangement according to claim 10 wherein the other end of the seal element engages with the other of the sub adaptor and drill spindle by frictional engagement by means of an O ring located around the periphery of the other end of the seal element.

13. A retaining arrangement according to claim 5 wherein the or each retaining body is a hollow part-cylinder.

14. A retaining arrangement according to claim 11 wherein the or each retaining body is a hollow part-cylinder.

15. A retaining arrangement according to claim 9 wherein the or each retaining body is a hollow part-cylinder.

16. A retaining arrangement according to claim 2 wherein the or each retaining body is a hollow part-cylinder.

17. The retaining arrangement of claim 1, wherein the connection region comprises one or more fastening apertures for receiving threaded fasteners, wherein the threaded fasteners connect the retaining body to the sub adaptor or drill spindle.

18. The retaining arrangement of claim 1, wherein the retaining bodies are half cylinders.

19. The retaining arrangement of claim 1, wherein the peripheral flange or rib positively engages with the other of the sub adaptor and drill spindle.

20. A retaining arrangement suitable for use with a drill string assembly having a sub adaptor and a drill spindle in use connected together via a screw thread arrangement, the retaining arrangement including:
- one or more retaining bodies, the or each retaining body comprising a connection region for removably connecting the or each retaining body to one of the sub adaptor and the drill spindle; and
- a first retaining or catch region adapted to catch the other of the sub adaptor and drill spindle;
- wherein the retaining bodies are half cylinders; and
- wherein the connection region comprises one or more fastening apertures for receiving threaded fasteners, wherein the threaded fasteners connect the retaining body to the sub adaptor or drill spindle via a corresponding screw thread arrangement located on the subadapter or drill spindle.

\* \* \* \* \*

UNITED STATES PATENT AND TRADEMARK OFFICE
CERTIFICATE OF CORRECTION

PATENT NO.       : 8,944,188 B2                                           Page 1 of 1
APPLICATION NO.  : 12/466768
DATED            : February 3, 2015
INVENTOR(S)      : Jacob Garth Lowry It is certified that error appears in the above-identified patent and that said Letters Patent is hereby corrected as shown below:

On the Title page, item (30) should read

FOREIGN APPLICATION PRIORITY DATA

Nov. 20, 2008   (AU) .................................................. 2008906009

Signed and Sealed this
Fifteenth Day of September, 2015

Michelle K. Lee
*Director of the United States Patent and Trademark Office*